(12) United States Patent
McBrearty et al.

(10) Patent No.: US 6,601,135 B1
(45) Date of Patent: Jul. 29, 2003

(54) NO-INTEGRITY LOGICAL VOLUME MANAGEMENT METHOD AND SYSTEM

(75) Inventors: Gerald F. McBrearty, Austin, TX (US); Ram Pandirl, Austin, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 09/714,733

(22) Filed: Nov. 16, 2000

(51) Int. Cl.$^7$ .............................................. G06F 12/00
(52) U.S. Cl. ......................... 711/112; 711/105; 711/173
(58) Field of Search ................................. 711/112, 105, 711/173; 707/205

(56) References Cited

U.S. PATENT DOCUMENTS 5,408,630 A * 4/1995 Moss ........................ 711/112
5,435,004 A * 7/1995 Cox et al. ................... 707/205
5,983,316 A * 11/1999 Norwood ..................... 711/112
6,041,395 A * 3/2000 Beelitz ........................ 711/173

* cited by examiner

Primary Examiner—Do Hyun Yoo
Assistant Examiner—Nasser Moazzami
(74) Attorney, Agent, or Firm—Thomas E. Tyson; Edmond A. DeFrank

(57) ABSTRACT

A no-integrity management method and system for managing logical volumes of a computer system. The no-integrity refers to the fact that the availability status of each partition within the mirrored logical volumes is not written to a direct access storage device but instead stored within a volatile memory. When the computer system is shutdown the availability status information is discarded, and the availability status of each partition is marked as active upon first open of a partition after startup of the computer system.

19 Claims, 5 Drawing Sheets

NO-INTEGRITY LOGICAL VOLUME MANAGEMENT METHOD AND SYSTEM

BACKGROUND OF THE INVENTION

1. Field of the Invention

The present invention relates in general to computer disk storage management and more particularly to a no-integrity management method and system for a logical volume of a computer system.

2. Related Art

Direct access storage devices (DASD) are widely used in mainframe computer systems to store data. In order to manage these direct access storage devices, several disk management techniques are available. One useful and popular technique is logical volume management. Instead of interfacing directly with a physical partition on the direct access storage device, a logical volume manager (LVM) divides the disk space on the drive into logical partitions. A logical partition may include several direct access storage devices but is transparent to a user, which means that the logical partition appears to the user as a single storage device.

At the lowest level of logical volume management is the physical direct access storage device itself. Each individual direct access storage device is formatted into a physical volume (PV) for use by the LVM. Each physical volume has a name and belongs to a volume group (VG). A volume group is a collection of direct access storage devices under the management of the LVM that are treated as a single large storage area. All physical volumes within a volume group are divided into physical partitions (PPs) of a certain size. These physical partitions are allocatable units of disk space, typically on the order of 2 megabytes or 4 megabytes. The total number of physical partitions on each direct access storage device varies and depends on the total capacity of the direct access storage device.

Each volume group defines one or more logical volumes (LVs). Logical volumes are groups of information located on physical volumes. Although data on a physical volume can be discontinuous, the data on a logical volume appears to the user as contiguous. This arrangement permits file systems, paging space and other logical volumes to be resized or relocated, span multiple physical volumes and have their contents replicated for greater flexibility and availability in data storage. Each logical volume includes one or more logical partitions (LPs), with each logical partition corresponding to at least one physical partition.

Mirroring of a logical volume is a technique that provides copies of the logical volume and prevents data loss due to disk failures, thereby offering greater data reliability. If mirroring is specified for a logical volume, the LVM allocates additional physical partitions to store the additional copies of each logical partition. Although the logical partitions are numbered consecutively, the underlying physical partitions are not necessarily consecutive or contiguous. The LVM marks each partition of the mirrored copies of the logical volume with an availability status that can be either stale or active. Only partitions that are marked as active can be read and written.

In general, the LVM changes the availability status of a partition from stale to active by using a swap space (also called a paging space). The swap space allows information to be swapped between random access memory (RAM) and the direct access storage device. By way of example, to change the availability status of a partition from stale to active the LVM uses the swap space to copy information from an active mirrored partition to a stale mirrored partition. The LVM keeps track of the availability status of each partition by writing the availability status information to the direct access storage device. Thus, at any point in time the availability status of each partition is stored in the direct access storage device and retained even if the computer system is shutdown. When the computer system is restarted, the availability status of each partition read from the direct access storage device and each partition is marked as either stale or active.

One problem with this type of logical volume management is that keeping track of the availability status of each partition on the direct access storage device uses a great deal of computer system resources. In particular, resources must be used to continually write and store partition availability status to the direct access storage device. Storing the availability status of each partition to the direct access storage device, remembering the status after system shutdown and marking each partition's availability status after system restart utilizes a tremendous amount of computer system resources and overhead. This overhead decreases performance of the computer system because the processor is busy writing and reading to the swap spaces and direct access storage device instead of processing other requests.

Accordingly, what is needed is a method for managing logical volumes (especially mirrored logical volumes) that does not keep track of the availability status of each logical volume partition on the direct access storage device. Instead, what is needed is a method that keeps track of the availability status in such a way that computer system resources are not heavily taxed. What is further needed is a method of logical volume management that saves computer system resources by not having to mark the availability status of each partition as either stale or active upon restart of the computer system.

SUMMARY OF THE INVENTION

To overcome the limitations in the prior art as described above and other limitations that will become apparent upon reading and understanding the present specification, the present invention includes a no-integrity management method and system for managing logical volumes of a computer system. The no-integrity management of the present invention keeps track of an availability status of each logical volume partition in volatile memory, such that the information is lost after computer system shutdown. Moreover, upon computer system restart the availability status of each partition is set to active.

The present invention conserves valuable computer system resources by eliminating the need to read and write availability status information to a direct access storage device. By keeping track of availability status information and any changes to that information in volatile memory, the present invention reduces overhead and permits system resources to be used for other tasks, thereby increasing system performance. Moreover, the present invention does not retain prior availability status information after system shutdown, thereby eliminating the need and overhead involved in storing and redesignating the availability status for each partition.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
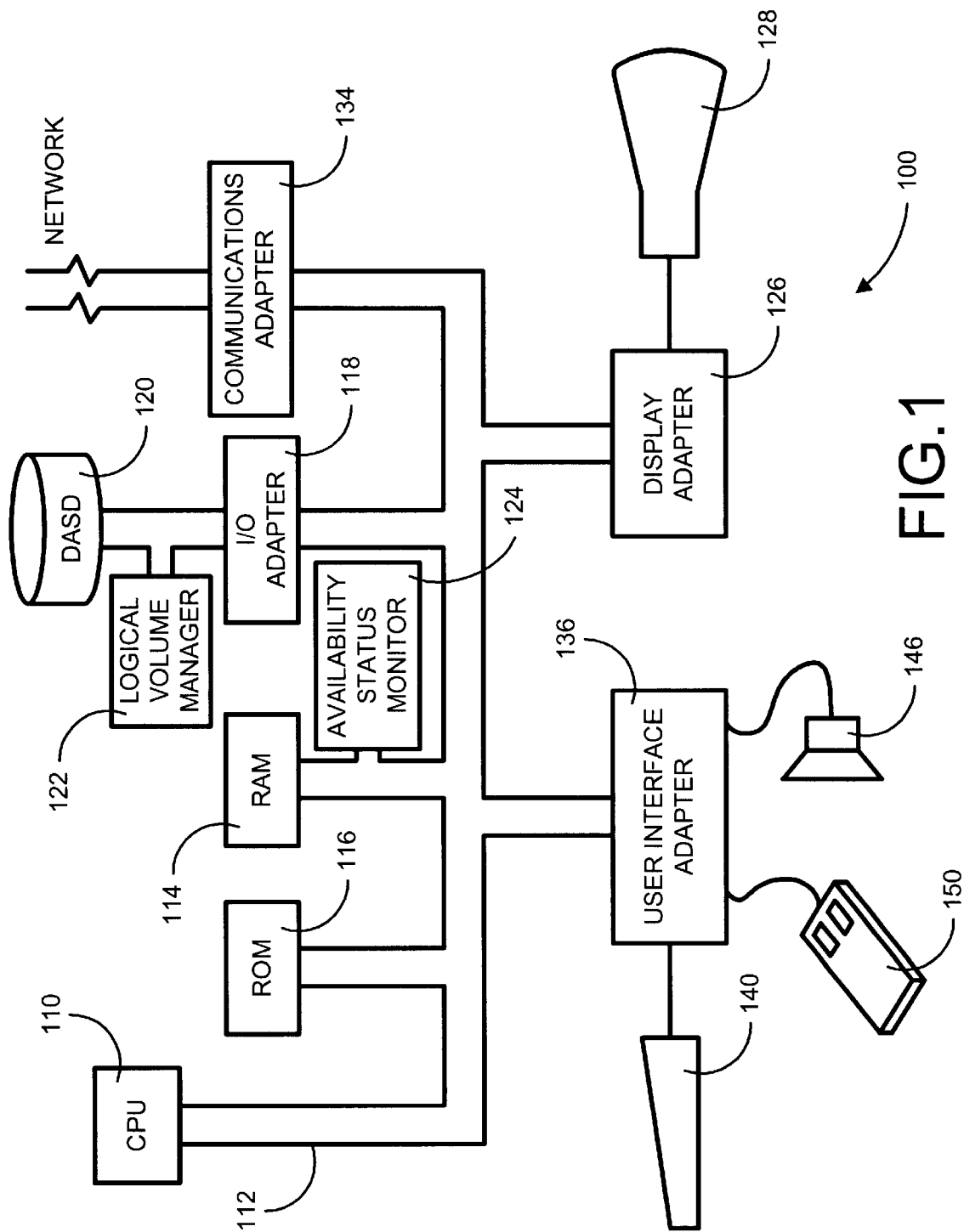
FIG. 1 is a block diagram of a computer system incorporating the present invention and is shown for illustrative purposes only.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Current logical volume management techniques store an availability status of each logical volume partition to a direct access storage device. Writing the availability status to the direct access storage device allows the status to be recalled even after the computer system has been shutdown. Upon computer system restart, the availability status for each logical volume partition is redesignated (or marked) according to the stored availability status information on the direct access storage device. Thus, the integrity and continuity of the availability status of each logical volume partition is maintained, even after computer system shutdown and restart. This logical volume management technique whereby the availability status information is written to a direct access storage device, stored and recalled after system shutdown impairs computer system performance because the processor is continually writing and reading availability status from the storage device. Moreover, the computer system generally does not need to know about the staleness of data in each partition after the computer system has been shutdown and restarted. Thus, storing availability status information to the direct access storage device, remembering the status after system shutdown and marking each partition's availability status after system restart results in a tremendous amount of wasted computer system resources and overhead.

The present invention includes a no-integrity method and system for managing logical volumes of a computer system. No-integrity means that the integrity of the availability status information is not preserved after computer system shutdown because this information is kept in volatile memory and not saved in a direct access storage device. Moreover, any changes that occur in the availability status of each partition are kept in volatile memory and not saved in the direct access storage device. By way of example, if a stale partition is resynchronized with active data such that the status of the partition is changed from stale to active, this change is noted only in volatile memory and not written to the direct access storage device. Thus, upon computer system restart and upon the first open of a partition, the present invention marks the availability status of all partitions as active.

The present invention provides several advantages over existing logical volume management techniques. First, because availability status information is not written to the direct access storage device and is kept in volatile memory, resources are not wasted reading and writing to the storage device. Second, whenever a change in availability status occurs this change is noted in volatile memory and not on the storage device, further saving resources. Finally, after restart of the computer system the present invention sets the availability status of all partitions to active and stores this information in volatile memory, thus avoiding the time, expense and overhead of saving, re-reading and marking availability status information for each partition.

II. Exemplary Operating Environment

As shown in FIGS. 1–5 for the purposes of illustration, the invention is embodied in a no-integrity method for managing mirrored logical volumes of a computer system. FIG. 1 and the following discussion are designed to provide a brief, general description of a suitable environment in which the present invention may be implemented. It should be noted that FIG. 1 depicts only one of several ways in which the present invention may be implemented. For example, those skilled in the art will appreciate that the invention may be practiced using a variety of computer systems such as, for example, personal computers (PC), server computers, hand-held devices, multiprocessor systems, microprocessor-based or programmable consumer electronics, network PCs, minicomputers, personal digital assistants (PDA) and mainframe computers.

FIG. 1 is a block diagram of a computer system incorporating the present invention and is shown for illustrative purposes only. In particular, a computer system 100 includes any suitable central processing unit (CPU) 110, such as a standard microprocessor, and any number of other objects interconnected by a computer bus 112. For purposes of illustration, the computer system 100 includes volatile memory (such as random-access memory (RAM) 114), read-only memory (ROM) 116, and a direct access storage device (DASD) 120 (such as a hard disk drive) having non-volatile memory. As used in this document, the phrase "non-volatile memory" includes memory that stores data even after the computer system 100 is shutdown (such as a hard disk drive). Likewise, the phrase "volatile memory" includes memory that does not retain any data contained therein after the computer system 100 is shutdown (such as, for example, RAM 114). The direct access storage device 120 is connected to the computer bus 112 by an input/output (I/O) adapter 118. The computer system 100 also includes a logical volume manager 122 to manage the direct access storage device 120 and an availability status monitor 124 in communication with the volatile RAM 114.

The computer system 100 further includes a display adapter 126 for connecting the computer bus 112 to a suitable display device 128. In addition, a user interface adapter 136 is capable of connecting the computer bus 112 to other user interface devices, such as a keyboard 140, a speaker 146, a mouse 150 and a touchpad (not shown). In a preferred embodiment, a graphical user interface (GUI) and an operating system (OS) reside within a computer-readable media and contain device drivers that allow one or more users to manipulate object icons and text on the display device 128. Any suitable computer-readable media may retain the GUI and OS, such as, for example, the RAM 114, the ROM 116 and the direct access storage device 120.

Figure 2:
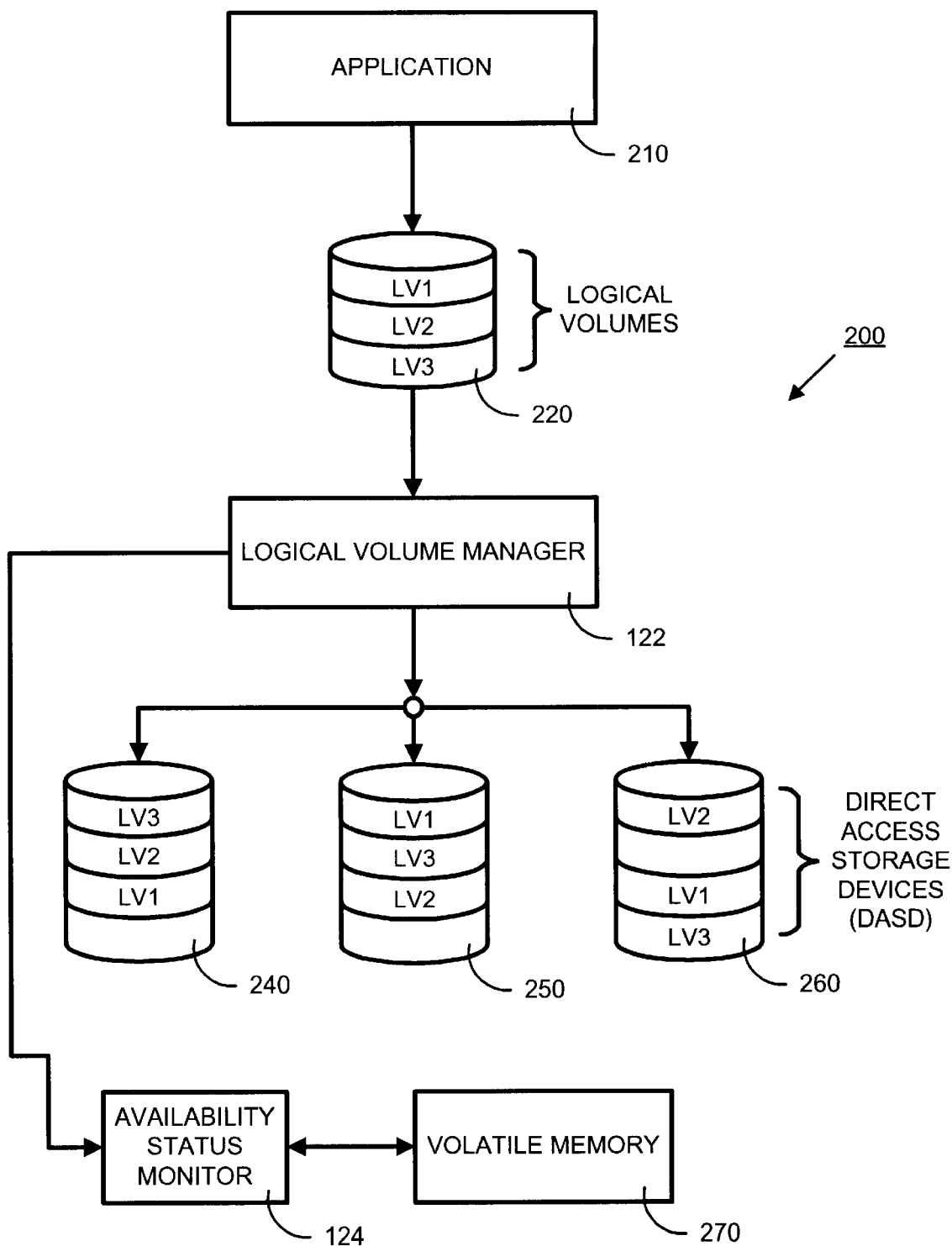
FIG. 2 is a general block diagram illustrating the components of the present invention.

FIG. 2 is a general block diagram illustrating the components of the present invention. In general, the logical volume management system 200 of the present invention includes an application 210 that runs on the computer system 100. The application 210 reads from and writes to the logical volume manager 122, which in turn controls the logical volumes 220 by reading from and writing to the partitions on the direct access storage devices 240, 250, 260 that represent each the logical volumes 220. As shown in the example of FIG. 2, the logical volumes 220 include LV1, LV2 and LV3. Although LV1, LV2 and LV3 appear to a user as contiguous on the direct access storage devices 240, 250, 260 (as shown by the logical volumes 220 in FIG. 2), in reality LV1, LV2 and LV3 generally are discontiguous. In fact, no matter how the logical volumes 220 are distributed on the direct access storage devices 240, 250, 260, the logical volumes 220 will appear contiguous to a user. The logical volumes 220 are managed by the logical volume manager 122 that is in communication with the application 210, the logical volumes 220 on the direct access storage devices 240, 250, 260 and the availability status monitor 124.

As shown in FIG. 2, the logical volumes 220 are mirrored over the direct access storage devices 240, 250, 260, typically in a discontiguous manner. The availability status monitor 124 is in communication with a volatile memory (such as the RAM 114 of FIG. 1). As explained in detail below, the logical volume manager 122 communicates with the availability status monitor 124 and writes and stores availability status information for each partition of the logical volumes 220 in the volatile memory 270.

III. General Operation

In general, the method of the present invention keeps track of the availability status in each partition in volatile memory instead of a direct access storage device. In addition, because this means that the availability status of each partition is not stored after shutdown of the computer system, the present invention sets the availability status of all partitions to active on computer system startup. The present invention alleviates the overhead associated with saving partition availability status information to the direct access storage device. This allows the input and output of the data from the application 210 to the logical volume 220 to be completed much sooner that if the availability status information was written to the direct access storage devices. Moreover, the present invention recognizes and makes use of the fact that for mirrored swap spaces it is not necessary to know the availability status of each partition upon the first opening.

Figure 3:
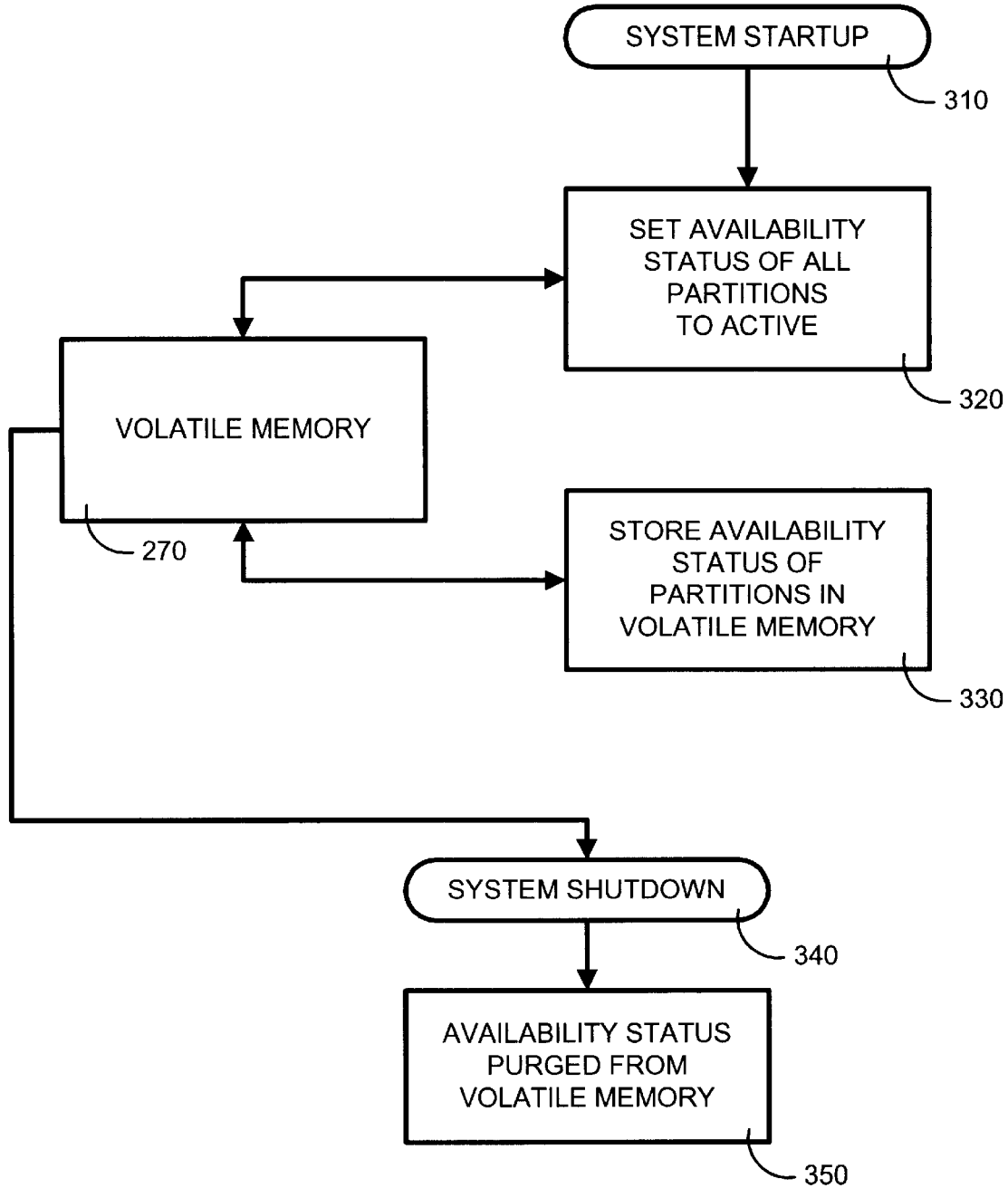
FIG. 3 is a general flow/block diagram of the method of the present invention.

FIG. 3 is a general flow/block diagram of the method of the present invention. In particular, when the computer system starts up (box 310) the present invention sets the availability status of all partitions to active (box 320). Moreover, the availability status of each partition is stored within the volatile memory (box 330) and not in the direct access storage devices. This saves computer system resources and overhead. When the computer system is shutdown (box 340), the availability status of each partition is purged from volatile memory (box 350). When the computer system is restarted, the cycle starts again and the present invention set the availability status of each partition to active (box 320).

IV. Operational Details

Figure 4:
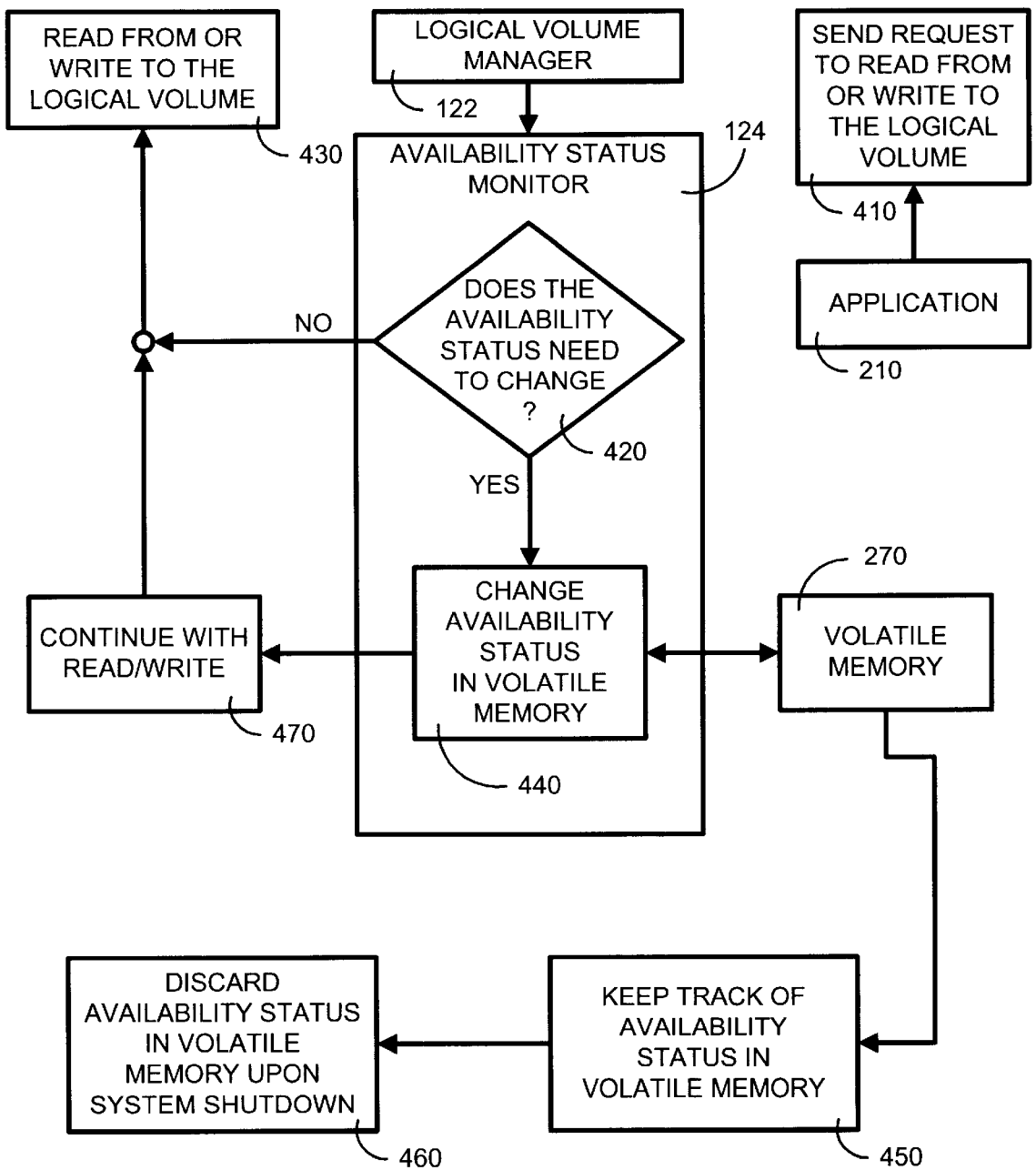
FIG. 4 is a detailed flow diagram of the method of the present invention when the state of a partition has changed.
Figure 5:
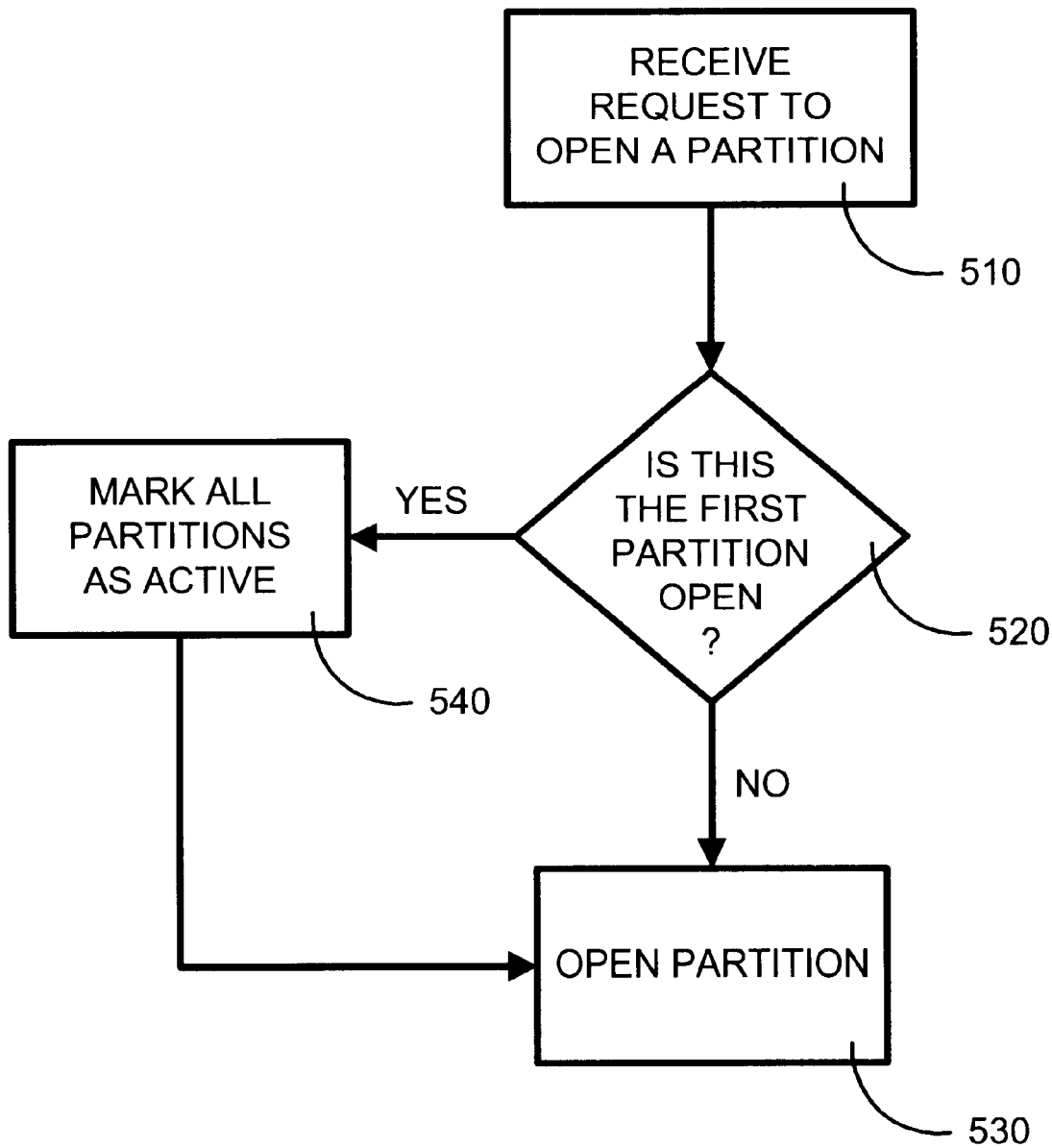
FIG. 5 is a detailed flow diagram of the method of the present invention when a partition is initially opened.

FIGS. 4 and 5 are detailed flow diagrams illustrating a preferred embodiment of the present invention. It should be noted that the present invention may be implemented in a variety of ways and actual implementation may vary from the following description. FIG. 4 is a detailed flow diagram of the method of the present invention when the state of a partition has changed. A change in the availability status of the partition from active to stale occurs when the application 210 attempts a mirrored write and fails on one-half of the mirror. In addition, a change in the availability status of the partition from stale to active occurs when synchronizing a stale partition with active data, thereby changing the availability status of the partition to active. As shown in FIG. 4, the application 210 initiates a request to read from or write to the logical volumes (box 410). The logical volume manager 122 receives the request, and send the request to the availability status monitor 124. The availability status monitor 124 determines whether the availability status of the partition need to change (box 420). The reasons for the availability status of a partition to change were discussed above.

If the availability status of the partition does not need to change, then the logical volume manager 122 controls the reading from or the writing to the logical volume (box 430). If the status does need to change, the present invention changes the availability status of the partition (box 440) in volatile memory 270. As discussed above, the present invention uses the volatile memory 270 to keep track of the availability status of each partition (box 450). The volatile memory 270 does not store the availability status information once the computer system has been shutdown, and therefore the status is discarded upon system shutdown (box 460). Once the availability status of the partition has been changed, the present invention continues with the read/write operation to the logical volume (box 470).

FIG. 5 is a detailed flow diagram of the method of the present invention when a partition is initially opened. A request is received to open a partition (box 510), and the present invention determines whether this is the first partition open (box 520). If not, then the requested partition is opened (box 530) and a read/write operation is performed on the logical volumes. On the other hand, if the present invention determines that this is the first partition open (such as after computer system startup), then all partitions are marked as active (box 540). In addition, as discussed above, the availability status of each partition is stored in the volatile memory 270.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for managing a logical volume having a plurality of partitions on a computer system, comprising storing an availability status of each of the plurality of partitions in a volatile memory location that does not include a direct access storage device, wherein the status is not recorded after the computer system is shutdown and preventing marking in the direct access storage device of each partition's availability status after system restart.

2. The method of claim 1 wherein the volatile memory is a computer memory that does not retain data contained therein after the computer system is shutdown.

3. The method of claim 2, wherein the volatile memory is random access memory (RAM).

4. The method of claim 1, further comprising setting the availability status of each of the plurality of partitions to active upon startup of the computer system.

5. The method of claim 4, further comprising setting the availability status of each of the plurality of partitions to active when a first of the plurality of partitions is opened.

6. The method of claim 1, further comprising determining that the availability status of at least one of the plurality of partitions needs to be changed.

7. The method of claim 6, wherein the availability status needs to be changed from active to stale because a mirrored write has failed.

8. The method of claim 6, wherein the availability status needs to be changed from stale to active because a stale partition has to be synchronized with active data.

9. A method for managing a plurality of partitions on a logical volume of a computer system, comprising:
   defining an availability status for each of the plurality of partitions;
   preventing the availability status from being preserved after the computer system is shutdown; and
   keeping track of the availability status of each of the plurality of partitions in a volatile memory location that does not include a direct access storage device.

10. The method of claim 9, wherein the availability status is at least one of: (a) active; (b) stale.

11. The method of claim 10, further comprising setting the availability status of each of the plurality of partitions as active when the first of the plurality of partitions is opened.

12. The method of claim 9, wherein the volatile memory no longer keeps track of the availability status once the computer system is shutdown.

13. The method of claim 9, wherein the volatile memory is random access memory.

14. A method for managing a logical volume of a direct access storage device within a computer system, the logical volume having plurality of partitions and the computer system having a volatile memory, comprising:
   setting an availability status of each of the plurality of partitions to active upon startup of the computer system;
   preventing the availability status from being preserved after the computer system is shutdown; and
   storing the availability status of each of the plurality of partitions in the volatile memory location that does not include a direct access storage device.

15. The method of claim 14, further comprising purging the stored availability status for each of the plurality of partitions from volatile memory upon shutdown of the computer system.

16. The method of claim 15, further comprising:
   determining that the availability status of at least one of the plurality of partitions needs to be changed; and
   changing the availability status in volatile memory.

17. A logical volume management system for no-integrity management of a plurality of partitions on the logical volume, comprising:
   a logical volume manager that controls the logical volume by reading and writing to the plurality of partitions; and
   an availability status monitor in communication with the logical volume manager that keeps track of availability status information for each of the plurality of partitions in a volatile memory location that does not include a direct access storage device, wherein the availability status information is not preserved after the computer system is shutdown and not marked in the direct access storage device.

18. The logical volume management system of claim 17, wherein the volatile memory is random access memory.

19. The logical volume management system of claim 17, wherein the logical volume is a mirrored logical volume.

* * * * *